United States Patent
Skiff

(10) Patent No.: US 6,709,691 B2
(45) Date of Patent: Mar. 23, 2004

(54) PROCESS FOR PRODUCING WASHED CITRUS OIL FLAVORS

(75) Inventor: Ronald Harry Skiff, Whippany, NJ (US)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 10/225,114

(22) Filed: Aug. 20, 2002

(65) Prior Publication Data

US 2003/0021883 A1 Jan. 30, 2003

Related U.S. Application Data

(62) Division of application No. 09/586,754, filed on Jun. 5, 2000, now Pat. No. 6,458,408.

(51) Int. Cl.$^7$ ............................................. A23L 1/222
(52) U.S. Cl. ...................... 426/651; 426/534; 426/650
(58) Field of Search .................................. 426/425, 429, 426/534, 650, 651

(56) References Cited

U.S. PATENT DOCUMENTS 3,809,757 A 5/1974 Kiley et al. .................. 426/223

OTHER PUBLICATIONS

Mei–Ling Wang et al., AN 94(08):T0046 FSTA, abstract, Journal of the Chinese Agricultural Chemical Society, 1994, 32(2), 141–148.

*Primary Examiner*—Leslie Wong
(74) *Attorney, Agent, or Firm*—Winston & Strawn LLP

(57) ABSTRACT

Citrus washed oil flavors can be formulated by a process which comprises treating a citrus oil with a mixture of propylene glycol and an alkanol from $C_1$ to $C_4$. The resulting washed oil flavors can be used as flavoring ingredients, notably for clear beverages.

16 Claims, No Drawings

PROCESS FOR PRODUCING WASHED CITRUS OIL FLAVORS

This application is a divisional of prior application Ser. No. 09/586,754 filed Jun. 5, 2000 now U.S. Pat. No. 6,458,408.

BRIEF SUMMARY OF THE INVENTION

The present invention relates to the flavor industry. It concerns more particularly a process for producing a washed citrus oil flavor, which comprises treating a citrus oil with a mixture of propylene glycol and an alkanol from $C_1$ to $C_4$. The invention also relates to clear beverages flavored with citrus washed oils as formulated by the process of the invention.

BACKGROUND OF THE INVENTION

The importance in the flavor industry of various citrus oils has resulted in intensive research directed towards processing methods, compositional analyses, quality and utilization.

Detailed compositional data concerning the commercially important citrus oils can be found in several reviews. Extensive lists of various chemical compounds identified as components of orange, grapefruit, tangerine, lemon, and lime oils have been described.

The flavoring characteristics of the citrus oils are a function of the properties of certain components identified in the oils. Furthermore, d-limonene, which is the main component present in citrus oils, acts as a carrier of flavor for other oxygenated compounds mainly responsible for the citrus flavor characteristics.

The extraction from a citrus oil of the oxygenated compounds which are responsible for the citrus flavor is therefore a field of huge interest for the flavor industry. It is well known in the art that flavoring agents may be prepared by extracting from folded oils the oxygenated compounds desired in an extracted or washed flavor profile.

The formulation of washed oil flavors disclosed in the prior art uses water or propylene glycol as solvents for the extraction of useful flavor compounds from a citrus oil. For instance, U.S. Pat. No. 3,809,757 describes the preparation of a flavoring extract from orange oil by selective extraction, using propylene glycol and a hydrocarbon solvent.

The quality of an extract or a wash is mainly characterized by the selectivity of the extracted compounds. The scope sought in the flavor industry when formulating a wash from a citrus oil, is therefore to selectively obtain the key citrus flavor compounds i.e., the oxygenated compounds such as neral, geranial, neral acetate, geranial acetate, decanal, nootkatone, etc. Other requirements such as clearness or flash point requirements are necessary for obtaining an optimized washed oil product.

DETAILED DESCRIPTION OF THE INVENTION

Now, we have been able to find a novel process for the preparation of a citrus washed oil flavor, combining propylene glycol usually utilized for the extraction of oxygenated compounds, with an alkanol from $C_1$ to $C_4$. This process makes it possible to obtain a surprisingly selective wash of the key flavor compounds present in a citrus oil, which further meets all the requirements of quality and security needed for such a product. The present invention is thus related to a process for producing a citrus washed oil flavor, which comprises treating a citrus oil with a mixture of propylene glycol and an alkanol from $C_1$ to $C_4$. In a preferred embodiment the alkanol is selected from the group consisting of ethanol and isopropanol.

The process of the invention advantageously allows to obtain citrus washed oil flavors which meet the clarity, flash point and usage level objectives required in the art. The washes obtained by the process according to the invention have a flash point greater than 100° F. (38° C.) (i.e. they belong to the Class I liquids), cut clear in water and have a light, clean profile with the hint of fruit flavor from 0.05 to 0.2%, preferably at a 0.1% use level. Moreover, analyses of the washed citrus oil flavors formulated respectively with and without the use of an alkanol from $C_1$ to $C_4$, clearly indicate that washes produced with the use of some alkanol are superior to those made with propylene glycol on its own. This result will be demonstrated in the comparative tables below, in the case of ethanol.

Unexpectedly, and besides the fact that alkanols from $C_1$ to $C_4$ suffer from the standpoint of their low flash point, we have now been able to optimize the formulation of citrus washed oils using the alkanol at the right level to extract the oxygenated compounds while meeting the flash point limitations.

The proportion of alkanol used in the extracting mixture with propylene glycol can vary in a certain range of values. Typically it can be comprised between 3 and 10% and is preferably comprised between 5 and 7% of the total weight of the composition comprising the citrus oil, propylene glycol and the alkanol.

As mentioned above, among the alkanols from $C_1$ to $C_4$, ethanol and isopropanol are preferred.

The starting product for the process of the invention may be any commercially available citrus oil, in the form of a cold pressed oil, or a folded oil, for instance. Non limiting examples of citrus oils which can be used for the process of the invention include lemon, berry, orange, grapefruit, tangerine, lime, kumquat, mandarin, bergamot and other essential oils or a mixture thereof.

The selectivity of the extraction system may be demonstrated by the comparison between citrus washes made with some ethanol, and washed oil flavors made with 75% propylene glycol: 25% flavor oil, i.e. ethanol free.

The following tables compare the washes obtained with propylene glycol combined with ethanol, and those obtained with propylene glycol on its own.

Table 1 reports the results for a lemon wash while Table 2 reports the results for a grapefruit wash.

TABLE 1

| compounds | Lemon Oil* | Lemon wash –83% PG –6% EtOH –11% Oil | Lemon wash –75% PG –25% Oil |
|---|---|---|---|
| Phellandrene | 0.75 | 0.39 | 0.36 |
| α Pinene | 3.32 | 2.10 | 1.52 |
| Camphene | 0.17 | | |
| Sabinene | | 2.30 | 1.80 |
| β Pinene | 19.68 | 16.10 | 10.43 |
| Myrcene | 2.45 | 1.56 | 1.61 |
| Limonene | 52.70 | 56.41 | 57.26 |
| (Iff)oximene | 0.48 | 0.37 | 0.42 |
| γ-Terpinene | 10.67 | 8.43 | 7.86 |
| a-Terpinolene | 0.67 | 0.56 | 0.53 |
| Nonanal | 0.27 | 0.29 | 0.15 |

TABLE 1-continued

| compounds | Lemon Oil* | Lemon wash −83% PG −6% EtOH −11% Oil | Lemon wash −75% PG −25% Oil |
|---|---|---|---|
| Linalol | 0.11 | 0.23 | 1.84 |
| Citronellal | 0.11 | | |
| α-Terpineol | 0.22 | 0.35 | 3.31 |
| Decanal | 0.12 | | |
| Neral | 1.53 | 0.61 | 0.68 |
| Geranial | 2.49 | 0.59 | 0.30 |
| Undecanal | <0.05 | | |
| Citronellyl acetate | 0.06 | | |
| Neryl acetate | 1.25 | 1.14 | 0.66 |
| Geranyl acetate | 0.75 | 0.60 | 0.30 |
| Caryophyllene | 0.46 | | |
| Neral/pg acetal | | 1.48 | 2.31 |
| A sesquiterpene | 0.70 | | |
| Neral/pg acetal | | 0.95 | 1.50 |
| Geranial/pg acetal | | 3.29 | 4.23 |
| Geranial/pg acetal | | 2.26 | 2.92 |
| β-Bisabolene | 1.00 | | |

*Origin: Firmenich Citrus Center, Florida, U.S.A.

TABLE 2

| compounds | Grapefruit Oil* | Grapefruit wash −83% PG −6% EtOH −11% Oil | Grapefruit wash −75% PG −25% Oil |
|---|---|---|---|
| α-Pinene | 0.52 | 2.08 | |
| Sabinene | 0.31 | | |
| Myrcene | 2.51 | | |
| Limonene | 75.04 | 80.55 | |
| Iffocimene | 0.51 | 0.71 | |
| Nonanal | 0.35 | 0.39 | |
| Linalol | 0.68 | 0.85 | |
| Limonene oxide | 0.31 | | |
| Citronellal | 0.51 | | |
| α-Terpineol | 2.13 | 2.51 | 39.74 |
| Decanal | 2.62 | 3.14 | |
| Octyl acetate | 0.58 | 0.47 | |
| Neral | 0.40 | | |
| Geranial | 0.47 | | |
| Neryl acetate | 0.08 | | |
| Geranyl acetate | 0.37 | | |
| α-Copaene | 0.96 | | |
| β-Cubebene | 0.89 | | |
| Caryophyllene | 2.60 | 0.84 | |
| α-Humulene | 0.43 | | |
| Pg acetal | | 0.90 | |
| δ-Cadinene | 0.88 | | |
| Nootkatone | 2.86 | 3.40 | |
| α-Coumarin | 0.69 | 2.10 | 60.26 |
| α-Benzopyranone | 3.31 | 2.05 | |

*Origin Firmenich Citrus Center, Florida, U.S.A.

It can be easily concluded from the results reported in the above tables that the use of some ethanol is advantageous in extracting the key flavor compounds (i.e. oxygenated compounds such as neral, geranial, neral acetate, geranial acetate, decanal, nootkatone, etc.) from a citrus oil.

The invention also relates to a method to impart, improve, enhance or modify the flavoring properties of a flavoring composition or a flavored product, which comprises adding to said composition or product a citrus washed oil flavor produced by the process of the invention.

Another object of the invention is a flavoring composition or a flavored product such as a clear beverage, comprising a citrus washed oil flavor as an active flavoring ingredient, the proportion of the latter being comprised between 0.05 and 0.2% of the total weight of the composition or product.

The invention will now be illustrated in a more detailed manner in the following example wherein the temperatures are indicated in degrees centigrade and the abbreviations have the usual meaning in the art.

EXAMPLE 1

General Processing Procedure for Producing a Citrus Washed Oil Flavor

Turn on the refrigeration to −8°

Add desired amount of flavor oil to mix tank at approximately 10–12° temperature Add desired amount of alkanol to mix tank at approximately 10–12° temperature Mix oil and alkanol with vigorous agitation for 20 min. (adjust agitation to avoid air bubbles)

Turn off agitation

Add desired amount of propylene glycol to mix tank at 21° temperature

Temperature of tank contents should be between 19–23°

Turn on agitation and mix vigorously, without incorporating air into the solution, for 20 min.

Turn agitation down to approximately 10–15 rpm

Turn on mix tank cooling jacket

Cool for approximately one hour with low agitation (i.e. 10–15 rpm). Turn off agitation when temperature reaches 0–5°

Continue to cool tank contents for 3 additional hours to approximately −2° to 0° with no agitation Turn cooling on coalescer product tank jacket Coalesce tank contents through Pall five microns and one micron filters at a rate of approximately 2.6–3.0 kg/min. (Optional: product may be centrifuged through a Westfalia centrifuge. A liquid—liquid centrifugation is preferred). Decant contents in coalescer product tank for 2 hours at −2 to 0°

Turn on refrigerant to final product tank jacket

Product is clear in a beverage application, from 0.05 to 0.2% usage level at 3°.

Flavor Production

Once product formulation and processing procedures were identified, the following flavors were produced, with a mixture of propylene glycol and ethanol:

Natural lime flavor*

Natural pink grapefruit flavor*

Natural grapefruit flavor*

Natural orange flavor*

Natural lemon flavor* oil origin: Firmenich Citrus Center, Fla., USA

Table 3 reports the formulation of citrus washes.

TABLE 3

| | LIME | PINK GRAPE-FRUIT | GRAPE-FRUIT | ORANGE | LEMON |
|---|---|---|---|---|---|
| Propylene glycol [%] | 83.3 | 83.3 | 83.3 | 83.3 | 83.3 |
| Deionized | 0 | 0 | 0 | 0 | 0 |

TABLE 3-continued

|  | LIME | PINK GRAPE-FRUIT | GRAPE-FRUIT | ORANGE | LEMON |
|---|---|---|---|---|---|
| water [%] |  |  |  |  |  |
| Ethanol [%] | 6.3 | 6.3 | 6.3 | 6.3 | 6.3 |
| Oil level [%] | 10.4 | 10.4 | 10.4 | 10.4 | 10.4 |
| Flash point [° F.] | 100 | 111 | 102 | 102 | 102 |

The washed oil flavors thus obtained were successively evaluated, on a blind test, by a panel of experts in the art of flavoring and compared to the corresponding washes obtained by extraction, following the method above-described, but using only 75% of propylene glycol and 25% of flavor oil. The panel indicated a systematic preference for the washes cited in Table 3, the organoleptic properties of which were judged superior to those of the washed oil flavors obtained without ethanol.

This result confirmed the GC/MSD analysis of the lemon and grapefruit washes reported respectively in Tables 1 and 2.

What is claimed is:

1. A citrus washed oil flavor produced by treating 5 to 25% by weight of a citrus oil with a mixture of 75 to 90% by weight of propylene glycol and 3 to 10% by weight of an alkanol from C1 to C4 in order to provide increased amounts of oxygenated compounds compared to a citrus washed oil flavor produced by treating a citrus oil with propylene glycol alone, wherein the oxygenated compounds include one or more of neral, geranial, neral acetate, geranial acetate, decanal, or nootkatone.

2. The flavor according to claim 1, wherein the alkanol is selected from the group consisting of ethanol and isopropanol.

3. The flavor according to claim 1, which has a flash point greater than 100° F.

4. The flavor according to claim 1, wherein the citrus oil is selected from the group consisting of lemon, berry, orange, grapefruit, tangerine, lime, kumquat, mandarin, bergamot, or a mixture thereof.

5. The flavor according to claim 1, wherein the oxygenated compounds includes one of more of neral, geranial, neral acetate, geranial acetate, decanal, or nookatone.

6. The flavor according to claim 5, wherein the alkanol is selected from the group consisting of ethanol and isopropanol.

7. The flavor according to claim 5, which has a flash point greater than 100° F.

8. The flavor according to claim 5, wherein the citrus oil is selected from the group consisting of lemon, berry, orange, grapefruit, tangerine, lime, kumquat, mandarin, bergamot, or a mixture thereof.

9. A flavoring composition or a flavored product comprising a citrus washed oil flavor according to claim 1 as an active flavoring ingredient.

10. The flavoring composition or a flavored product according to claim 9, wherein the proportion of the citrus washed oil flavor is between 0.05 and 0.2% of the total weight of the composition or product.

11. A clear beverage comprising a citrus washed oil flavor according to claim 1 as flavoring agent.

12. The clear beverage according to claim 11, wherein the proportion of the citrus washed oil flavor is between 0.05 and 0.2% of the total weight of the beverage.

13. A flavoring composition or a flavored product comprising a citrus washed oil flavor according to claim 5 as an active flavoring ingredient.

14. The flavoring composition or a flavored product according to claim 13, wherein the proportion of the citrus washed oil flavor is between 0.05 and 0.2% of the total weight of the composition or product.

15. A clear beverage comprising a citrus washed oil flavor according to claim 5 as flavoring agent.

16. The clear beverage according to claim 15, wherein the proportion of the citrus washed oil flavor is between 0.05 and 0.2% of the total weight of the beverage.

* * * * *

UNITED STATES PATENT AND TRADEMARK OFFICE
CERTIFICATE OF CORRECTION

PATENT NO. : 6,709,691 B2 Page 1 of 1
APPLICATION NO. : 10/225114
DATED : March 23, 2004
INVENTOR(S) : Skiff It is certified that error appears in the above-identified patent and that said Letters Patent is hereby corrected as shown below:

<u>Column 5</u>:
Line 26, change "25% by weight" to -- 15% by weight --; and
Line 28, change "C1 to C4" to -- $C_1$ to $C_4$ --.

Signed and Sealed this

Twenty-eighth Day of August, 2007

JON W. DUDAS
*Director of the United States Patent and Trademark Office*